L. W. BUGBEE.
TRIAL SET.
APPLICATION FILED DEC. 18, 1917.
1,361,824.
Patented Dec. 14, 1920.
2 SHEETS—SHEET 1.
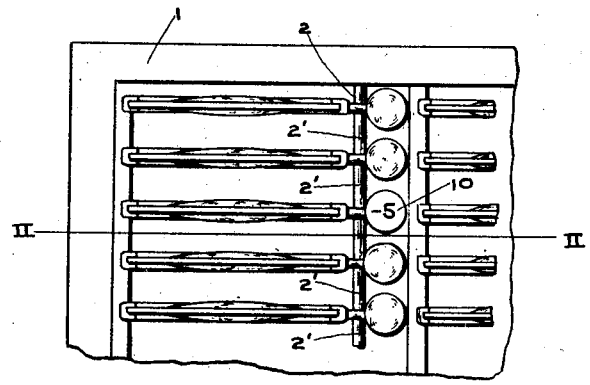
FIG. I
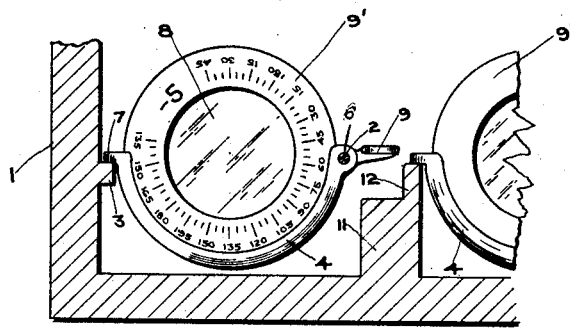
FIG. II
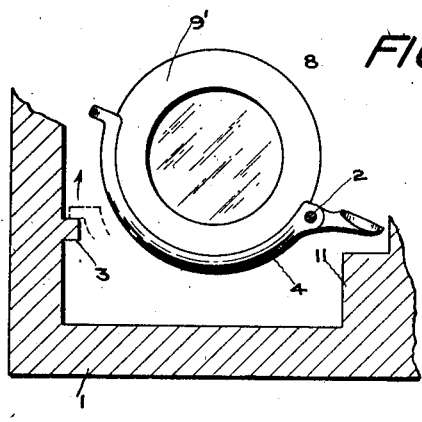
FIG. III
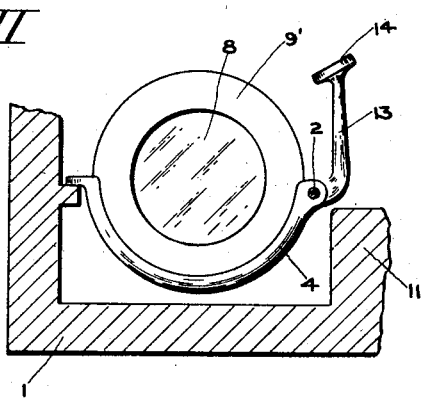
FIG. IV
INVENTOR
LUCIAN W. BUGBEE.
BY
H. H. Styll & H. K. Parsons
ATTORNEYS L. W. BUGBEE.
TRIAL SET.
APPLICATION FILED DEC. 18, 1917.
1,361,824.
Patented Dec. 14, 1920.
2 SHEETS—SHEET 2.
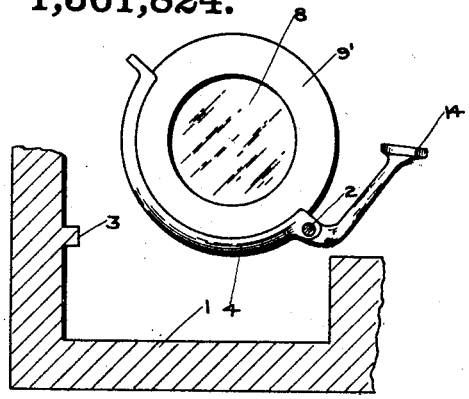
FIG. V
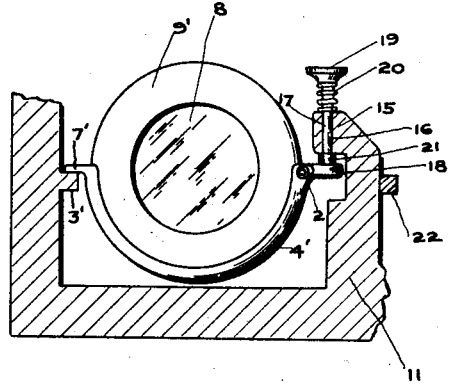
FIG. VI
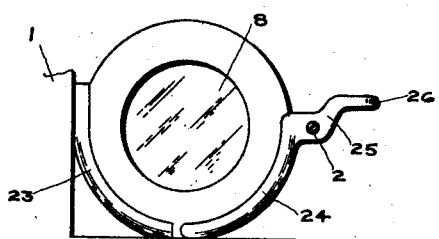
FIG. VII
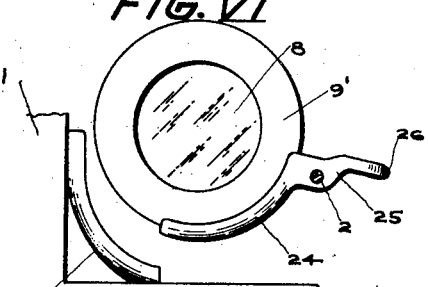
FIG. VIII
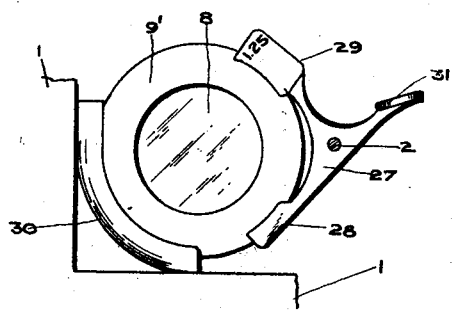
FIG. IX
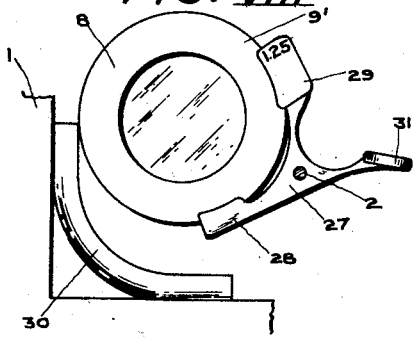
FIG. X
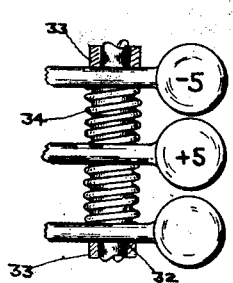
FIG. XI
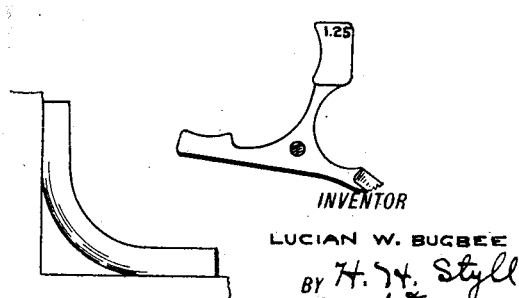
FIG. XII
INVENTOR
LUCIAN W. BUGBEE
BY H. H. Styll
H. K. Parsons
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL SET.

1,361,824.      Specification of Letters Patent.      Patented Dec. 14, 1920.

Application filed December 18, 1917. Serial No. 207,710.

*To all whom it may concern:*

Be it known that I, LUCIAN W. BUGBEE, a citizen of the United States, residing at Southbridge, in the county of Worcester and State of Massachusetts, have invented certain new and useful Improvements in Trial Sets, of which the following is a specification.

This invention relates to new and useful improvements in trial cases and more particularly to a case for supporting and retaining therein a plurality of trial lenses, and main object of the present invention being the provision of a case of this character wherein trial lenses are supported by novel means which will facilitate the ready removal of the lenses when desiring to use the same and at the same time will securely retain them in their relative positions within the case.

Another object of the present invention is the provision of a trial case having therein movable supporting means for trial lenses, which are adapted to be manually operated to facilitate the removal of the trial lenses and are so arranged that the means which support each one of the lenses are disposed in a position ready to receive a lens when returning the same to the trial case so that each lens can be quickly and readily replaced in its proper place upon returning the same to the case.

A still further object is the provision of a trial case having movable lens supporting means therein which are provided with indicators plainly visible from the open top of the case so that the desired lens can be quickly and readily removed from the case and each of the lenses being provided upon its supporting frame with an identification mark similar to the mark on the supporting member so that the lens can be returned to its proper place within the case.

With the above and other objects in view the invention consists in the novel features of construction and the combination and arrangement of parts hereinafter more fully set forth, pointed out in the claims, and shown in the accompanying drawings, in which—

Figure I is a detailed plan view illustrating a portion of the case with the trial lenses in their respective positions.

Fig. II is a detailed sectional view taken along line 2—2 of Fig. I illustrating the trial lens in its respective position.

Fig. III is a similar view illustrating the trial lens in its raised position and about to be removed from its support.

Fig. IV is a similar view illustrating a slightly modified form of operating lever.

Fig. V is a view similar to Fig. IV illustrating a lens frame in its raised position.

Fig. VI is a detailed sectional view illustrating a modified form of actuating means for raising the movable lens support.

Fig. VII is a detailed transverse section illustrating another form of the invention.

Fig. VIII is a similar view illustrating the trial lens in its raised position.

Fig. IX is another transverse sectional view illustrating still another form of the lens support.

Fig. X is a similar view illustrating the lens in its raised position.

Fig. XI is a top plan view illustrating the use of friction springs between the actuating levers whereby the lens supporting member will be retained in a raised position so that the lens can be readily returned to its respective position.

Fig. XII is a side elevation of the form shown in Figs. IX and X, the lens being removed.

Referring now more particularly to the drawings wherein the various reference symbols indicate the several parts throughout the views, the numeral 1 indicates the casing of my improved trial case which may be rectangular in form or of any other desirable shape and provided upon its interior with the spaced rods 2, and arranged in alinement with these rods are the laterally projecting ribs 3 which extend outwardly from the inner wall of the casing in one instance to provide suitable supporting means. Disposed between one of the rods 2 and the supporting shelf or rib 3 is an arcuate arm 4 channel-shaped in cross section and provided at one end with an enlarged portion 5 having a pivot opening 6 to receive the rod 2 upon which the arm 4 is mounted. The opposite end of the arm is provided with a lateral lip 7 adapted to engage over the shelf or rib 3 to support the arm 4 in its operative position as illustrated in Fig. II.

The arm 4 which supports the trial lens 8 is provided with a fingerpiece 9 adjacent its pivot point, said fingerpiece having a flattened surface as shown at 10 adapted to be readily engaged by one of the fingers of the hand to actuate the arm 4 and raise and lower the same within the case 1. The lens 8 is provided with a retaining band 9' having a plurality of graduations thereon to indicate the axis of the cylinder lens whereby to readily facilitate fitting of the lens when arranged in a trial frame. From this it will be apparent that by pressing downwardly upon the fingerpiece 9, the arm 4 may be readily raised to the position illustrated in Fig. III so as to permit the lens 8 to be readily withdrawn from the groove in the arm 4 and placed in the trial frame or other instrument according to the use to which the lens is to be put. It will be noted that as soon as pressure has been disengaged from the fingerpiece 9, the weight of the arm 4 will tend to return the same to its normal or inoperative position.

It will be understood that any number of rows of lenses may be arranged within the trial case and in each instance where the lip 7 of the arm 4 does not engage with the shelf or rib 3, I have provided an upright standard 11 having an upstanding portion 12 upon one side thereof for engagement by the lip 7 to support the other arms in their proper positions. The upper surface 10 of the fingerpiece 9 is provided, as indicated, with identification numbers and said numbers are adapted to correspond with similar numbers upon the frame of the trial lenses whereby each of the lenses may be quickly and readily returned to its respective position after being used in testing the eyes of a patient.

In Fig. II I have illustrated a device wherein the various lenses are disposed in their respective positions, while in Fig. III one of the lens frames is shown in its raised position ready for removal for disposal within a trial frame or other instrument used for testing the eyes. In Fig. IV I have illustrated another form of invention wherein the short fingerpiece is entirely eliminated, and attached in any suitable manner or integrally formed with the arm 4 adjacent its pivoted point, is an actuating lever 13, the outer end of which is provided with a fingerpiece 14 adapted for engagement by the fingers of the operator to raise and lower the lens supporting means and raise the lens to such a position so that the same can be quickly and readily removed from the case. The fingerpiece upon the arm 13 is likewise provided with an identification mark similar to the one shown in those formerly mentioned and is to correspond with the identification mark upon the lens frame. In Fig. V this form of the invention is illustrated in its raised position showing how easily the lens can be grasped and removed from the case without interfering with the respective positions of any of the remaining lenses. Furthermore, the proper lens can be readily removed from the case through the medium of the identification marks on the fingerpieces and in returning the lens to the case, the mark on the lens frame will correspond with the number on the fingerpiece so that each lens can be returned in its proper place.

In Fig. VI I have illustrated another form of the invention wherein the arcuate arm 4' is provided at one end with a lip 7' extending outwardly at right angles from the arm, said lip engaging the rib 3' to support the arm at one end while the other end of the arm is supported by the transverse pivot rod 2. In order to actuate the arm 4' upon its pivot, I have provided a bearing shoulder at the upper edge of the transverse portion 11, and extending down through this bearing portion are the openings 16 having mounted for reciprocating movement therein the rods 17, the lower ends of said rods engaging with the upper face of the lip 18 formed on the end of the arm opposite the lip 7' and arranged adjacent the pivot point of the arm. The upper end of the pin 17 is provided with a fingerpiece 19 and disposed between the fingerpiece 19 and the bearing portion 15 is a coil spring 20 which is adapted to normally retain the actuating pin 17 in its raised or normal position. It will be apparent from the foregoing that upon pressing downwardly upon the fingerpiece 19, the pin 17 will be actuated against the lip 18 of the arm 4' so as to swing the arm upon its pivot and raise the trial lens 8 to such a position that it can be readily removed from the case. After the lens has been removed from the arm 4', the arm will drop back to its normal position within the case as soon as the fingerpiece 19 is released, the coil spring 20 will return the pin 17 to its raised position, and the outstanding lug 21 formed on the inner end of the pin will tend to limit the outward movement of the same so that the pin will at all times be retained within the opening 16. It will be noted that in this form of invention, the bearing ridge 12 is eliminated and a rib 22 is formed upon one face of the upright 11 for engagement by the ends of the arms which are disposed in alinement with the section of lenses illustrated in Fig. VI.

In Fig. VII I have illustrated another form of the invention wherein the lens supporting means within the case is formed in two separate sections one of which is stationary within the case while the other section is movable for raising the lens in a position so that it can be readily removed from the case. It will be noted from the illustrations that the section 23 is stationary within the case while the section 24 is provided with a bearing shoulder 25 having a transverse opening to receive the pivot rod 2. The bearing portion 25 is provided with an outwardly projecting handle member 26 having a flat upper surface whereby pressure may be applied thereto for raising the lower or curved portion 24 of the arm so that the lens arranged within the arm can be easily raised to the position illustrated in Fig. VIII. In this form of the invention it will be noticed that when raising the lens to a position for facilitating the ready removal of the same from the case, pressure is brought to bear upon the fingerpiece 26 and as the portion 24 is raised, carrying the lens before it, the opposite edge of the lens will roll up within the portion 23 so that when the lens is in its raised position as illustrated in Fig. VIII, it will be supported upon the end of the section 24.

In Figs. IX and X I have illustrated another form of the invention which includes a substantially L-shaped arm, V-shaped in cross section, to provide a receiving groove for the trial lens and the means adapted to raise the lens from the support includes a plate 27 enlarged at one end and forked to provide the two arms 28 and 29, the arm 28 extending the greater portion of its length upon the lower side of the lens while the arm 29 bears against the lens or frame thereof whereby on pivotal movement of the plate 27, the arm 28 will tend to raise the lens 8 from its support 30, the arm 29 tending to guide or retain a lens in contact with the arm 28. The end of the plate 27 opposite the arms 28 and 29 is reduced and transversely flattened as shown at 31 to provide a finger engaging piece so that when pressure is brought to bear upon the surface 31, the arms 28 and 29 will tend to raise the lens from its support 30 and dispose the same in such a position that it can be readily removed from the case.

It will be noted from the illustrations in Figs. IX and X that the plate 27 is mounted for pivotal movement on the rod 2 so that the lens 8 can be readily removed from its support 30 and disposed in such a position that it may be quickly and readily removed from the case. In this form of the invention, the arm 29 is somewhat wider than the arm 28 and provided with the identification marks which correspond with the identification marks on the the frame 9 of the lens so that after the lens 8 has been removed, the arm 29 will be disposed in a substantially vertical position whereby the identification number upon the arm 29 will be plainly visible above the top of the case so that the lens may be readily returned to its proper position.

In Fig. XI I have illustrated still another form of the invention which includes, as far as the supporting arm and actuating lever are concerned, practically the same construction as illustrated in Figs. IV and V but exclusive of this I have provided the bearing portion 32 with transverse sleeves 33 extending from opposite sides of the arm 4 to retain the arms and lenses in spaced relation to each other when arranged within the case, and mounted upon these sleeves between the supporting arms are the coil springs 34 which frictionally engage the sides of the arms so that after the arms have been raised to the position illustrated in Fig. V, and the lens removed therefrom, the arms will be retained in a raised position, by having the ends of the springs frictionally engaged with the sides of the arms 4. It will be noted, however, that after the lenses have been replaced within the arcuate arms, the arms may be pressed downwardly within the case and arranged in their proper positions. It will be apparent from Fig. I that the supporting arms 4 are retained in spaced relation by means of the longitudinal sleeves 2' which are mounted upon the rod 2 and disposed between the arms to retain them in spaced relation with the case.

I claim:

1. A trial lens container including a plurality of grooved members forming pockets, segmental grooved fingers forming continuations of said members, means for rocking the segmental members to raise the trial lenses from the pockets, and indicators associated with the fingers for designating the power of lens for a particular pocket.

2. A trial lens shifting device in the form of a triskele having one of its arms forming a lens rest and shifter, a second of its arms forming a lens guide and indicator, and another of its arms forming an operating portion.

3. A trial lens shifting device in the form of a triskele having one of its arms forming a lens rest and shifter, a second of its arms forming a lens guide and indicator, and another of its arms forming an operating portion, said device having a central pivot receiving aperture formed therein, substantially as and for the purpose described.

4. A device of the character described including a plurality of grooved segmental pockets and intermediately pivoted arms having grooved portions forming continuations of the pockets and having laterally extending operating portions for shifting the grooved portion to project a member from the pocket, and an indicator brought into prominent position through ejective shifting of the member to denote the pocket from which the article has been removed.

5. A device of the character described comprising a plurality of stationary pocket sections, shiftable fingers forming continuations of the pocket sections and a mounting for said fingers comprising a pivot rod, spacing members on the rod between the several fingers, and means on the spacing members for frictionally locking the individual fingers in desired adjusted relation.

6. A trial lens case comprising a container having a plurality of pockets, an independent ejector for each of said pockets pivoted adjacent thereto, said ejector having a portion normally locking an article within the pocket and serving when in released position as an indicator to denote that said article has been removed from the pocket.

7. A device of the character described including a holder having a plurality of pockets, a pivot adjacent the pockets and an operating member mounted thereon having three branches, one of said branches supporting and one guiding an article within the pocket, and the third being in the form of an operating key to shift the member to eject an article from the pocket.

8. A device of the character described including a holder having a plurality of pockets, a pivot adjacent the pockets and an operating member mounted thereon having three branches, one of said branches supporting and one guiding an article within the pocket, and the third being in the form of an operating key to shift the member to eject an article from the pocket, the guiding member being disposed to project upwardly when shifted and being provided with means for designating the article which has been removed from the pocket.

9. A device of the character described including a holder having a plurality of pockets, a pivot adjacent the pockets and an operating member mounted thereon having three branches, one of said branches supporting and one guiding an article within the pocket, and the third being in the form of an operating key to shift the member to eject an article from the pocket, the guiding member being disposed to project upwardly when shifted and being provided with means for designating the article which has been removed from the pocket, and frictional means for securing the shifting device in desired adjusted position.

10. An individual lens control for trial cases comprising a three branched member having an arm adapted to be engaged beneath the lens to lift the lens from the pocket, an arm for rocking the member to project the lens from the pocket, and an arm for guiding the lens as projected and normally retaining it in the pocket.

11. An individual lens control for trial cases comprising a three branched member having an arm adapted to be engaged beneath the lens to lift the lens from the pocket, an arm for rocking the member to project the lens from the pocket, an arm for guiding the lens as projected and normally retaining it in the pocket, and friction means for locking the lens in raised or depressed position as desired.

In testimony whereof I have affixed my signature, in presence of two witnesses.

LUCIAN W. BUGBEE.

Witnesses:
HARRY H. STYLL,
H. K. PARSONS.